United States Patent [19]

Noland

[11] 4,194,894
[45] Mar. 25, 1980

[54] FILTER BAG ASSEMBLY FOR BAGHOUSES

[76] Inventor: Richard D. Noland, 1900 W. 47th Pl., Ste. 308, Shawnee Mission, Kans. 66205

[21] Appl. No.: 949,891

[22] Filed: Oct. 10, 1978

[51] Int. Cl.² .......................................... B01D 46/02
[52] U.S. Cl. .................. 55/379; 55/341 R; 55/357; 55/DIG. 26
[58] Field of Search ................. 55/96, 294, 304, 305, 55/341 R, 356, 357, 378, 379, DIG. 26; 210/470

[56] References Cited

U.S. PATENT DOCUMENTS

| | | | |
|---|---|---|---|
| 2,836,257 | 5/1958 | Muller | 55/DIG. 26 |
| 2,981,368 | 4/1961 | Johnson | 55/379 |
| 3,186,147 | 6/1965 | O'Dell | 55/379 X |
| 3,856,489 | 12/1974 | Vokral | 55/379 |
| 4,014,672 | 3/1977 | Jansson | 55/379 X |
| 4,042,356 | 8/1977 | Miller | 55/379 X |
| 4,089,664 | 5/1978 | Noland | 55/379 X |
| 4,097,254 | 6/1978 | Noland | 55/294 |
| 4,138,234 | 2/1979 | Kubesa | 55/379 X |

FOREIGN PATENT DOCUMENTS

| | | | |
|---|---|---|---|
| 506393 | 10/1951 | Belgium | 55/357 |
| 1448248 | 6/1966 | France | 55/379 |
| 1297194 | 11/1972 | United Kingdom | 55/379 |

Primary Examiner—Richard L. Chiesa
Attorney, Agent, or Firm—Lowe, Kokjer, Kircher, Wharton & Bowman

[57] ABSTRACT

A filter bag and cage assembly which can be installed or removed from beneath the tube sheet of a baghouse. The filter bag is releasably mounted by a snap ring to a collar secured to the bottom of the tube sheet. A wire mesh cage providing skeletal support for the bag is suspended therein by a hanger which includes a pivotal support bar extending across and supported on the upper rim structure of the bag. When removal of the assembly downwardly is desired, as when there is insufficient clearance above the baghouse, the support bar is raised slightly and pivoted such that it is able to fit into the bag. The snap ring is then released, and the entire assembly can be lowered from the tube sheet together.

6 Claims, 3 Drawing Figures

FILTER BAG ASSEMBLY FOR BAGHOUSES

BACKGROUND AND SUMMARY OF THE INVENTION

This invention relates generally to industrial baghouses and deals more particularly with an improved filter bag assembly which may be installed or removed either upwardly or downwardly from the tube sheet of a baghouse.

Continuous emphasis on environmental quality has resulted in increasingly strenuous regulatory controls on industrial emissions. One technique which has proven highly efficient in controlling air pollution has been separation of undesirable particulate matter from a gas stream by fabric filtration.

Such filtration is carried out in dust collection apparatus known in the trade as a "baghouse" which operates on the same general principle as an ordinary household vacuum cleaner, except on a much larger scale. Basically, the baghouse is a sheet metal housing divided into two chambers, referred to as plenums, by one or more tube sheets. Disposed within openings communicating with the plenums are fabric filters. A particle laden gas stream, induced by the action of a fan, flows into one chamber (dirty air plenum) wherein dust accumulates on the fabric filter as the gas passes through the fabric into the other chamber (clean air plenum) and out the exhaust.

Although all baghouses are designed in accordance with the foregoing general principles, there are numerous operational and structural distinctions. The present invention relates to a baghouse in which the dirty and clean air plenums are separated by a tube sheet having a plurality of vertically suspended filter bags that receive cylindrical wire cages for skeletal support. Filtration of the process gas occurs from outside to inside of the bag. Therefore, baghouses constructed in this manner are normally referred to as outside bag collectors. An example of this type of baghouse is disclosed in my U.S. Pat. No. 4,097,254, which is incorporated herein by reference.

It is inevitable that, in service, the filter bags will develop leaks or other damage which impairs their effectiveness in removing particulate matter from contaminated gas. In order to stay within industrial emissions standards and operate at peak efficiency, it is imperative that defective bags be identified and replaced. Therefore, maintaining the bags in proper condition is of crucial importance to operation of the baghouse.

The replacement of defective bags has traditionally been a time consuming and costly maintenance operation which often requires a number of workers. With the top access doors opened, the bags and associated rigid cages can normally be removed from the tube sheet in an upwardly direction. Where there is little room above the baghouse, as may be encountered in a low ceiling building, this manner of removal of the bags which are typically 8 feet or more in length is difficult or in some cases impossible. Even if there is sufficient room for upward removal of the bags, the workmen must often work in cramped quarters which greatly increases the difficulty of the task and the time required to complete it.

Therefore, it is apparent that a need exists for a filter bag assembly which can be easily removed from its supporting tube sheet in a downwardly direction as well as upwardly when bag replacement is necessary, and which can easily be installed from beneath the tube sheet. The primary goal of the present invention is to meet this need.

More specifically, it is an object of the invention to provide a filter bag and cage assembly which can be quickly and easily installed or removed from beneath the tube sheet of the baghouse. The hanger arrangement which supports the case within the filter bag permits convenient bottom installation or removal in situations where there is insufficient clearance space above the baghouse to enable installation from above or upward removal of the rigid cages. If there is sufficient clearance above the baghouse, installation or removal from above may be carried out with equal convenience.

Another object of the invention is to provide a filter bag and cage assembly of the character described in which the cage is supported on the sturdy upper rim structure of the filter bag rather than on the bottom of the bag.

A further object of the invention is to provide the fiter bag and cage assembly of the character described wherein standard filter bags may be employed and there is no need for significant modification of the tube sheet.

An additional object of the invention is to provide a filter bag and cage assembly of the character described which is constructed simply and economically.

Other and further objects of the invention, together with the features of novelty appurtenant thereto, will appear in the course of the following description of the drawings.

DETAILED DESCRIPTION OF THE INVENTION

In the accompanying drawings which form a part of the specification and are to be read in conjunction therewith, and in which like reference numerals are employed to indicate like parts in the various views.

Figure 1:
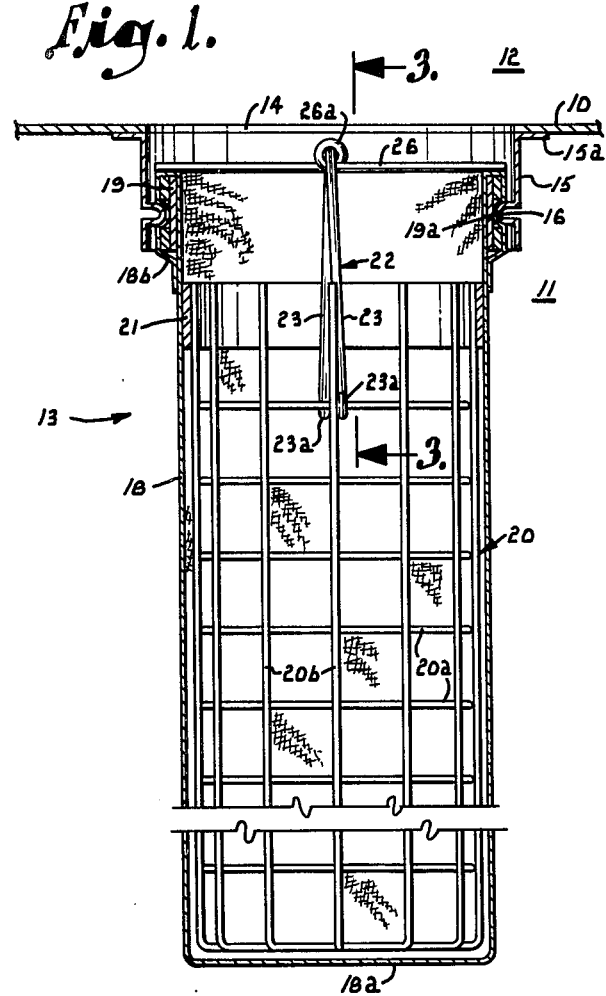
FIG. 1 is an elevational view, partially in section, showing a filter bag and cage assembly suspended from a tube sheet in accordance with a preferred embodiment of the present invention, the portions broken away indicating continuous length of the bag and cage.

Referring now to the drawing in more detail, numeral 10 generally designates a metal tube sheet which is disposed in an outside collector baghouse. The tube sheet 10 is disposed horizontally and separates a dirty air plenum 11 from a clean air plenum 12 located above the tube sheet. Particle laden process gas flows, by action of a fan (not shown), from the dirty air plenum 11 through a plurality of filter cartridges which filter the dust and other particulate matter from the gas prior to discharge of the clean gas through an exhaust duct (not shown) communicating with the clean air plenum.

Numeral 13 identifies one of the filter cartridges which is suspended from the tube sheet 10 within a cylindrical opening 14 formed through the tube sheet. A cylindrical collar 15 is mounted to the underside of the tube sheet adjacent opening 14 in order to provide a flat surface of the tube sheet in the clean air plenum. A flange 15a formed on the upper edge of collar 15 is welded or otherwise affixed to the bottom of the tube sheet to secure the collar in place. Collar 15 has a continuous bead 16 projecting inwardly therefrom at a location intermediate its height.

The filter cartridge 13 includes a conventional open topped filter bag 18 formed of a suitable fabric material and having a bottom panel 18a. The upper portion of bag 18 is folded over a snap ring 19 to form a cuff 18b. The snap ring 19 is a spring like metal band which tends to expand outwardly by spring action in order to releasably attach bag 18 to collar 15. The outer surface of ring 19 presents a continuous recess 19a which is large enough to receive the bead 16 of collar 15. Ring 19 urges cuff 18b outwardly such that recess 19a and bead 16 register with one another with the cuff 18b located therebetween. In this manner, the filter bag 18 is sealingly suspended from collar 15.

A wire mesh cage 20 provides skeletal support for bag 18. The cage 20 includes spaced apart circular rings 20a which are secured to vertical wires 20b. The case has a wire mesh bottom and is open at the top. A metal band 21 is welded to extend around the upper rim of the cage.

Figure 3:
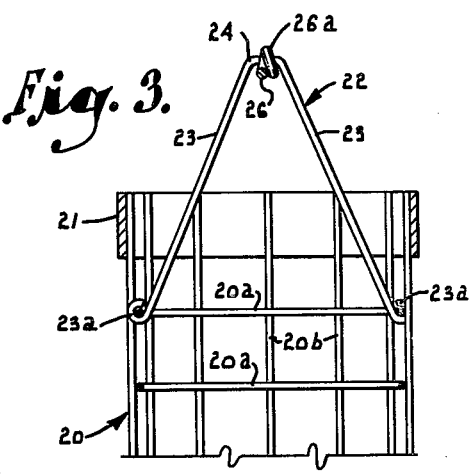
FIG. 3 is a fragmentary sectional view of the cage and hanger taken generally along line 3—3 of FIG. 1 in the direction of the arrows.

A hanger 22 in the general shape of an inverted V is used to suspend cage 20 within the filter bag 18. The hanger has a pair of legs 23 which are preferrably constructed of wire. As best shown in FIG. 3, legs 23 diverge as they extend downwardly and are looped at 23a on their bottom ends around one of the rings 20a of cage 20. The loops 23a are at diametrically opposed locations on ring 20a. The converging upper end portions of legs 23 are interconnected by an integral, short horizontal portion 24 located at the vertex of the inverted V.

Hanger 22 includes a rigid wire bar 26 which serves to support the hanger such that cage 20 is properly located within bag 18. Bar 26 has an eye 26a at its center which is looped around portion 24 of the hanger to pivotally connect bar 26 therewith. Bar 26 is able to freely pivot about the axis of member 24 between the positions shown in FIGS. 1 and 2. Bar 26 is long enough to span the diameter of the upper rim structure of bag 18 but is shorter than the diameter of opening 14.

In use, bag 18 is attached to collar 15 in the manner shown in FIG. 1 with the outward spring force of ring 19 maintaining cuff 18b tightly against the bead 16 of the collar. If inserted from above, the cage 20 is simply lowered into the filter bag with bar 26 in a horizontal position. When fully lowered, bar 26 rests on top of the upper rim structure of bag 18 at its opposite ends and hanger 22 supports cage 20 at the desired position within the bag. It is noted that the bottom of cage 20 is spaced slightly above the bottom panel 18a of the filter bag so that the entire weight of the cage and hanger is applied to the sturdy rim structure of the bag (which is reinforced by ring 19), rather than on the bottom of the bag. Hanger 22 supports cage 20 in a stable position wherein it provides adequate skeletal support for bag 18 as gas is passed there through during operation of the baghouse.

For inspection or replacement of the filter bag or cage, the entire filter cartridge 13 can be removed either upwardly or downwardly from the tube sheet 10. Upward removal is accomplished by raising bar 26 to pull cage 20 and hanger 22 upwardly out of bag 18. Snap ring 19 is then released from collar 15 so that bag 18 can be raised in the usual manner into the clean air plenum.

Since there is often not enough height in the clean air plenum 12 to accommodate upward removal of the cartridge assembly, downward removal must be employed in many instances. To remove the cartridge downwardly from the tube sheet, bar 26 is initially raised slightly and pivoted to the position shown in FIG. 2. Legs 23 are long enough to permit the bar to be freely pivoted without interference from band 21 or any other part of cage 20. Once the bar has been pivoted sufficiently to clear the upper rim structure of bag 18, it can be lowered into the bag until the bottom of the cage rests on the bottom of the bag. Ring 19 can then be released from collar 15 and the entire assembly can be lowered in unison into the dirty air plenum 11.

Figure 2:
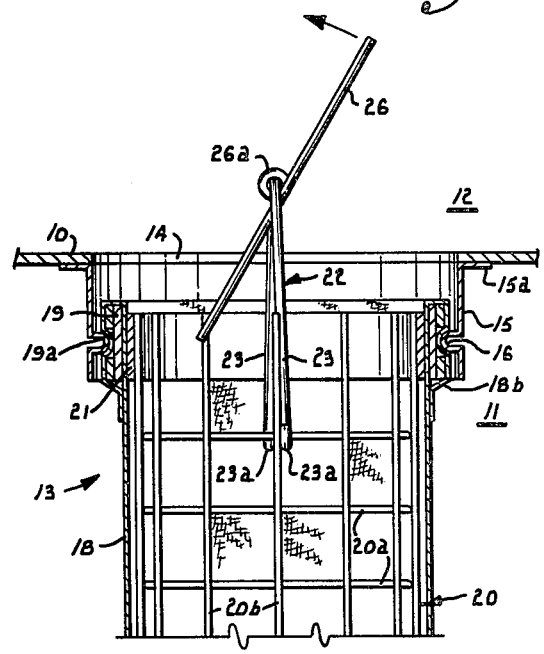
FIG. 2 is a fragmentary sectional view similar to the upper portion of FIG. 1 but showing the cage raised and the hanger bar pivoted to a release position for removal of the bag and cage from the tube sheet.

When installing the filter assembly from beneath the tube sheet the cage is first fully inserted into the bag with the hanger bar inclined from horizontal (see FIG. 2). The spring ring 19 is deformably collapsed by the installer to reduce the circumference thereof for insertion within the collar 15. When released, the ring 19 springs back to sealingly mate against the collar 15 with bead 16 projecting into recess 19a. The cage is then raised slightly so bar 26 projects out of the bag mouth to be oriented to a horizontal position. The cage is subsequently lowered until the bar 26 rests across the bag mouth.

From the foregoing it will be seen that this invention is one well adapted to attain all the ends and objects hereinabove set forth together with the other advantages which are obvious and which are inherent to the structure.

It will be understood that certain features and subcombinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having described the invention, I claim:

1. A filter bag assembly for a baghouse having a tube sheet which presents an opening therethrough, said assembly comprising:
   a bag-like fabric filter having an upper rim positionable beneath said tube sheet;
   releasable band means for suspending said filter from the tube sheet in registration with the opening thereof, said releasable means permitting installation and removal of said filter from beneath said tube sheet;
   a cage adapted to fit in said filter to provide skeletal support therefor;
   a hanger coupled with said cage for suspending same in said filter; and
   a support bar pivotally coupled to said hanger in a manner to support same in position to suspend said cage in the filter, said support bar having a first position horizontally spanning the upper rim of said filter to prevent passage of said support bar downwardly into said filter, and a second position wherein said support bar is oriented nonhorizontally to pass downwardly within said filter whereby the filter bag assembly may be installed and removed from beneath the tube sheet.

2. The invention of claim 1, wherein said hanger includes a pair of legs each having one end connected with said cage.

3. The invention of claim 2, wherein said legs converge toward the ends thereof opposite said one end to form an apex for receiving said support bar.

4. The invention of claim 1, said support bar being of sufficient length to span the rim of said filter and being supported on top of said rim in extension across same when in the first position.

5. The invention of claim 4, wherein said opening of the tube sheet has a diameter greater than the length of said bar.

6. The invention of claim 1, including a collar projecting from the tube sheet below said opening, said releasable means suspending said filter from said collar.

* * * * *